US012561702B2

(12) United States Patent
Coutu et al.

(10) Patent No.: US 12,561,702 B2
(45) Date of Patent: Feb. 24, 2026

(54) PRODUCT CUSTODY VERIFICATION USING MACHINE-READABLE CODE

(71) Applicant: GlobalFoundries U.S. Inc., Malta, NY (US)

(72) Inventors: Peter T. Coutu, Williston, VT (US); Romain H.A. Feuillette, Williston, VT (US); Alain F. Loiseau, Williston, VT (US)

(73) Assignee: GLOBALFOUNDRIES U.S. Inc., Malta, NY (US)

( * ) Notice: Subject to any disclaimer, the term of this patent is extended or adjusted under 35 U.S.C. 154(b) by 226 days.

(21) Appl. No.: 18/463,668

(22) Filed: Sep. 8, 2023

(65) Prior Publication Data

US 2025/0086657 A1      Mar. 13, 2025

(51) Int. Cl.
*G06Q 30/018*          (2023.01)
*G06K 7/14*            (2006.01)

(52) U.S. Cl.
CPC ....... *G06Q 30/0185* (2013.01); *G06K 7/1404* (2013.01)

(58) Field of Classification Search
CPC .. G06Q 30/185; G06Q 10/08; G06Q 30/0185; G06F 21/86–21/87; H05K 1/0275
See application file for complete search history.

(56) References Cited

U.S. PATENT DOCUMENTS 6,557,244 B1    5/2003  Yang
6,888,159 B2    5/2005  Farnworth et al.
9,613,912 B2    4/2017  Scanlan
10,229,886 B2   3/2019  Yu et al.
10,242,951 B1   3/2019  Piper
10,373,913 B2   8/2019  Scanlan
10,528,942 B2   1/2020  Purves
10,552,621 B2   2/2020  Smith et al.
(Continued)

OTHER PUBLICATIONS

Evans, Improving the transparency of the pharmaceutical supply chain through the adoption of quick response (QR) code, Internet of Things (IOT), and blockchain technology: One result: Ending the Opioid crisis, Pitt. J. Tech. L. & Pol'y, vol. 19, No. 35, 2018 (Year: 2018).*

(Continued)

*Primary Examiner* — Daniel Vetter
(74) *Attorney, Agent, or Firm* — Jessie Cheah; Hoffman Warnick LLC

(57)          ABSTRACT

A system and computerized method verify product custody along a product manufacturing chain. The method may include verifying a first machine-readable (MR) code for a product level N is valid by comparing the first MR code to a database of valid MR codes. Where the first MR code for the product level N is verified as valid, a second, valid MR code is generated for a next product level N+1 in the database of valid MR codes. In addition, the first MR code for the product level N in the database of valid MR codes is invalidated, so it cannot be used again. The second MR code is formed for use with the next product level N+1, e.g., by the downstream product manufacturer. Custody of product levels along a manufacturing chain can be verified and secured, avoiding bad actors from inserting and profiting from fake parts into the manufacturing chain.

20 Claims, 4 Drawing Sheets

(56) References Cited

U.S. PATENT DOCUMENTS

| | | | | |
|---|---|---|---|---|
| 2005/0067491 | A1* | 3/2005 | Ishikawa | G06Q 10/087 |
| | | | | 235/383 |
| 2006/0175401 | A1* | 8/2006 | Roberts | G06Q 10/087 |
| | | | | 235/383 |
| 2011/0156033 | A1 | 6/2011 | Bintang et al. | |
| 2014/0232017 | A1 | 8/2014 | Rampley et al. | |
| 2016/0064296 | A1 | 3/2016 | Suzumura | |
| 2016/0351508 | A1 | 12/2016 | Kalyanaraman et al. | |
| 2018/0269091 | A1 | 9/2018 | Ophir | |
| 2020/0065826 | A1* | 2/2020 | Gering | G06Q 30/018 |
| 2021/0057232 | A1 | 2/2021 | Pio | |
| 2022/0123939 | A1* | 4/2022 | Guinard | G06Q 30/0185 |
| 2022/0358673 | A1* | 11/2022 | Patel | G06Q 30/0185 |
| 2023/0419255 | A1* | 12/2023 | Xiu | G06Q 10/06375 |
| 2024/0095483 | A1* | 3/2024 | Liu | G06Q 30/0185 |
| 2025/0086657 | A1 | 3/2025 | Coutu et al. | |

OTHER PUBLICATIONS

Xu, et al., Electronics supply chain integrity enabled by blockchain, ACM Transactions on Design Automation of Electronic Systems (TODAES), vol. 24, No. 3, 2019, pp. 1-25 (Year: 2019).*

Tehranipoor, et al., Chip ID, Counterfeit Integrated Circuits: Detection and Avoidance, Cham: Springer International Publishing, 2015, pp. 243-263 (Year: 2015).*

Guin, Robust, Low-Cost, and Accurate Detection of Recycled Integrated Circuits (ICs) using Digital Signatures, 2022 (Year: 2022).*

Vashistha, et al., eChain: A blockchain-enabled ecosystem for electronic device authenticity verification, IEEE Transactions on Consumer Electronics, vol. 68 No. 1, 2021, pp. 23-37 (Year: 2021).*

Mirchandani and Kashyap, "Blockchain in the Semiconductor Industry: 5 Innovative Use Cases Gaining Traction," Manufacturing Leadership Council Insights, Jan. 13, 2022, 12 pages.

QR Code Laser Marking of Silicon Wafer, POTOMAC The Leader in Digital & Micro Fabrication, Feb. 6, 2011, 3 pages.

Markman et al., "Photon-Counting Security Tagging and Verification Using Optically Encoded QR Codes," IEEE Photonics Journal, vol. 6, No. 1, 6800609, Feb. 2014, 10 pages.

Batista et al., "QR Code micro-certified gemstones: femtosecond writing and Raman characterization in Diamond, Ruby and Sapphire," Scientific Reports, 9:8927, 2019, 7 pages.

Unknown; htt Group (Tomorrow's Technology Today); "Wafer Reader"; <https://www.httgroup.eu/en/wafer_reader/>; 5 pages; retrieved Jun. 6, 2023.

Non Final Office Action dated Sep. 11, 2025 for U.S. Appl. No. 18/341,893, filed Jun. 27, 2023; pp. 12.

\* cited by examiner

152

152

152

152

152

PRODUCT CUSTODY VERIFICATION USING MACHINE-READABLE CODE

BACKGROUND

The present disclosure relates to product custody verification and, more particularly, to product custody verification along a product manufacturing chain using machine-readable codes.

Fraudulent parts can be inserted into a legitimate product manufacturing chain. For example, a product manufacturing chain that relies on integrated circuit (IC) chips can be impacted by fraudulent parts. In this example, fraudulent parts may include the IC chips and/or related downstream products such as IC chip packages and modules, printed circuit boards and end products that use the IC chips. Fraudulent IC chips or downstream products can negatively affect quality, safety and security of the end products, and the reputation of manufacturers along the product manufacturing chain.

SUMMARY

All aspects, examples and features mentioned below can be combined in any technically possible way.

An aspect of the disclosure provides a computing system, comprising: a memory; a processor coupled to the memory and configured to verify product custody along a product manufacturing chain according to a method that includes: verifying a first machine-readable (MR) code for a product level N is valid by comparing the first MR code to a database of valid MR codes; generating a second, valid MR code for a next product level N+1 in the database of valid MR codes and invalidating the first MR code for the product level N in the database of valid MR codes in response to verifying the first MR code for the product level N is valid; and forming the next product level N+1 with the second MR code for use with the next product level N+1.

An aspect of the disclosure provides a computerized method for verifying product custody along a product manufacturing chain, comprising: verifying a first machine-readable (MR) code for a product level N is valid by comparing the first MR code to a database of valid MR codes; generating a second, valid MR code for a next product level N+1 in the database of valid MR codes and invalidating the first MR code for the product level N in the database of valid MR codes in response to verifying the first MR code for the product level N is valid; and forming the next product level N+1 with the second MR code for use with the next product level N+1.

An aspect of the disclosure provides a computing system, comprising: a memory; and a processor coupled to the memory and configured to verify product custody along an integrated circuit (IC) chip product manufacturing chain according to a method that includes: verifying a first machine-readable (MR) code for an IC chip-including product level N is valid by comparing the first MR code to a database of valid MR codes; generating a second, valid MR code for a next, IC chip-including product level N+1 in the database of valid MR codes and invalidating the first MR code for the IC chip-including product level N in the database of valid MR codes in response to verifying the first MR code for the IC chip-including product level N is valid; and forming the next, IC chip-including product level with the second MR code for use with the next, IC chip-including product level N+1.

Two or more aspects described in this disclosure, including those described in this summary section, may be combined to form implementations not specifically described herein. The details of one or more implementations are set forth in the accompanying drawings and the description below. Other features, objects and advantages will be apparent from the description and drawings, and from the claims.

BRIEF DESCRIPTION OF THE DRAWINGS

The embodiments of this disclosure will be described in detail, with reference to the following figures, wherein like designations denote like elements, and wherein.

Figure 1:
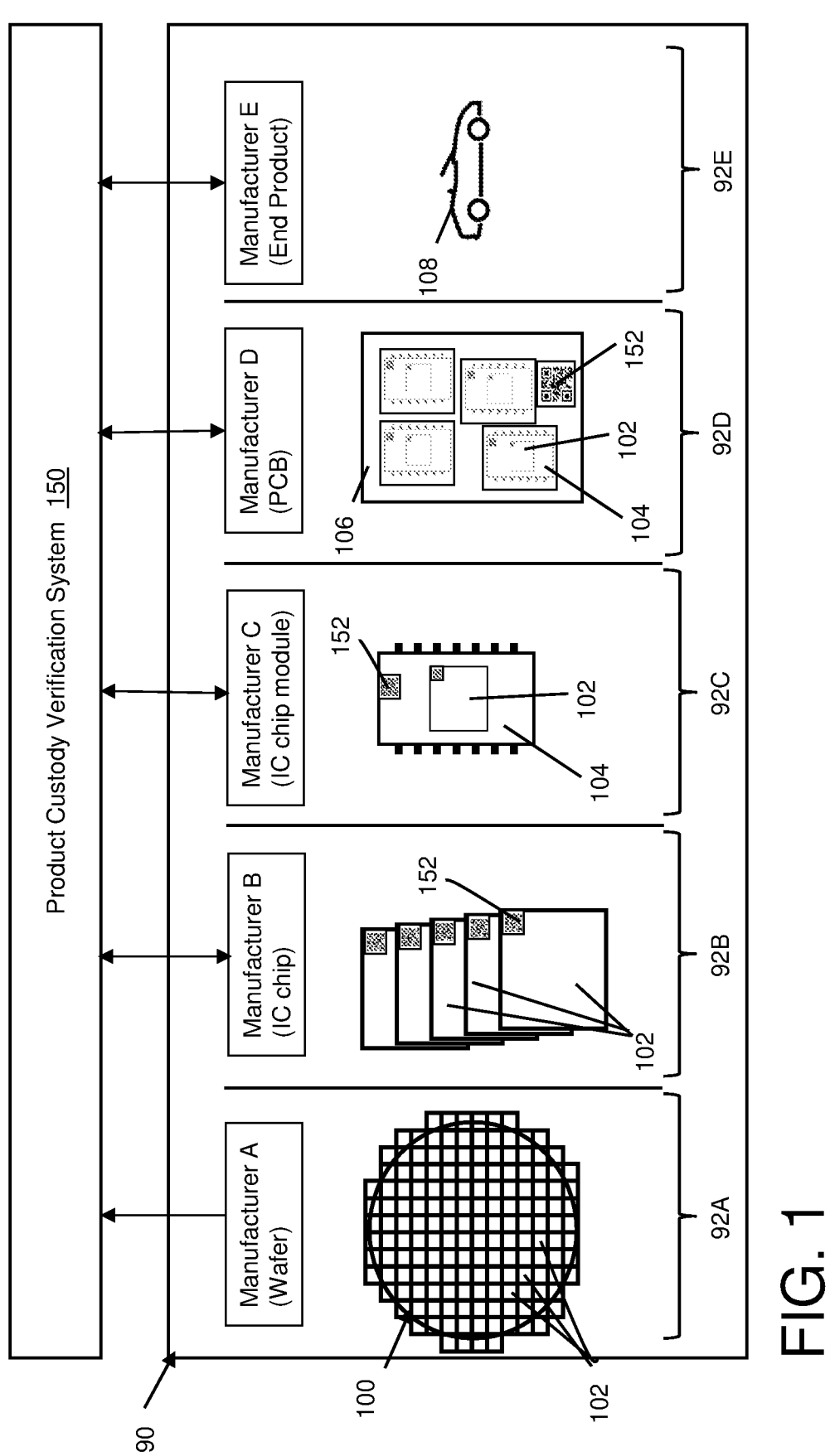
FIG. 1 is a schematic view of an illustrative product manufacturing chain with product levels that use integrated circuit (IC) chip(s) and a product custody verification system, according to embodiments of the disclosure.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

In the following description, reference is made to the accompanying drawings that form a part thereof, and in which is shown by way of illustration specific illustrative embodiments in which the present teachings may be practiced. These embodiments are described in sufficient detail to enable those skilled in the art to practice the present teachings, and it is to be understood that other embodiments may be used and that changes may be made without departing from the scope of the present teachings. The following description is, therefore, merely illustrative.

Reference in the specification to "one embodiment" or "an embodiment" of the present disclosure, as well as other variations thereof, means that a particular feature, structure, characteristic, and so forth described in connection with the embodiment is included in at least one embodiment of the present disclosure. Thus, the phrases "in one embodiment" or "in an embodiment," as well as any other variations appearing in various places throughout the specification are not necessarily all referring to the same embodiment. It is to be appreciated that the use of any of the following "/," "and/or," and "at least one of," for example, in the cases of "A/B," "A and/or B" and "at least one of A and B," is intended to encompass the selection of the first listed option (A) only, or the selection of the second listed option (B) only, or the selection of both options (A and B). As a further example, in the cases of "A, B, and/or C" and "at least one of A, B, and C," such phrasing is intended to encompass the first listed option (A) only, or the selection of the second listed option (B) only, or the selection of the third listed option (C) only, or the selection of the first and the second listed options (A and B), or the selection of the first and third listed options (A and C) only, or the selection of the second and third listed options (B and C) only, or the selection of all three options (A and B and C). This may be extended, as readily apparent by one of ordinary skill in the art, for as many items listed.

Embodiments of the disclosure include a product custody verification system and related computerized method to verify product custody along a product manufacturing chain or flow. The method may include verifying a first machine-readable (MR) code for a product level N is valid by comparing the first MR code to a database of valid MR codes, i.e., compare the decrypted or decoded data of the respective MR codes. The first MR code may be provided, for example, by an upstream product manufacturer that manufactures (the product at) the product level N. A request from a downstream product manufacturer that manufactures product level N+1 can be made to the system to verify product level N is valid, i.e., legitimate. Where the first MR code for the product level N is verified as valid, a second, valid MR code is generated for a next product level N+1 in the database of valid MR codes. In addition, once used, the first MR code for the product level N in the database of valid MR codes is invalidated, so it cannot be used again. The second MR code is formed for use with the next product level N+1, e.g., by the downstream product manufacturer. The process can repeat for each product manufacturer along the manufacturing chain or flow. In this manner, custody of product levels along a manufacturing chain can be verified and secured, avoiding bad actors, e.g., outside entities, from profiting from inserting fraudulent parts in the manufacturing chain. The verification system also provides custody assurance for products having highly valuable and/or national security applications. The verification system also allows live monitoring of each product level through the manufacturing flow.

FIG. 1 is a schematic view of an illustrative product manufacturing chain or flow 90 with different product manufacturers A-E and a product custody verification system 150 (hereafter "system 150" or "computing system 150"), according to embodiments of the disclosure. For purposes of description, the disclosure will be described relative to a product manufacturing chain or flow 90 (hereafter "chain 90") that uses integrated circuit (IC) chips. In this example, chain 90 may include at least two of the following product manufacturers: an IC chip fabricator, an IC chip separator, an IC chip module manufacturer, an IC chip packager, an IC chip package end user, a printed circuit board (PCB) manufacturer, and a PCB end user. Also, for purposes of description, the disclosure will be described relative to chain 90 having five manufacturers; however, the teachings of the disclosure can be applied to a chain having any number of product manufacturers and product levels. For description purposes, each product manufacturer A-E makes one or more different product levels 92A-E. "Product level" means a product at any point of chain 90 and may include but is not limited to raw materials, intermediate products, parts and materials of any kind, and end products 108. For example, manufacturer A may make semiconductor wafers 100 each including many IC chips 102 therein; manufacturer B may purchase wafers 100 and separate IC chips 102 therefrom and resell IC chips 102; manufacturer C may purchase IC chips 102 and make IC chip packages or modules 104 therefrom; manufacturer D may purchase IC chip packages 104 and make printed circuit boards (PCBs) 106 therefrom; and manufacturer E may purchase PCBs 106 and make an end product 108 that uses PCBs 106. End product 108 can be any product that requires IC chips 102 and/or other product levels 92B-C such as but not limited to: all varieties of electronic devices, computer-based systems, automobiles, and smartphones. In this manner, wafers 100, IC chips 102, IC chip packages 104, PCBs 106 and end products 108 each represent a respective product level 92 for the illustrative IC chip manufacturing chain 90. As will be recognized, chain 90 can include a large variety of alternative end products 108 that would benefit from the teachings of the disclosure.

While FIG. 1 shows each manufacturer A-E making one product level, it will be recognized that each product manufacturer A-E may make more than one product level. For example, one product manufacturer may make PCBs 106 and end product 108. In this case, product manufacturers along chain 90 may use system 150 for any desired product level(s). For example, the product manufacturer may use system 150 where it initially receives an upstream product from another upstream product manufacturer. Alternatively, the product manufacturer may use system 150 for one or more product levels within its purview, ensuring custody within the product manufacturer's facility or multiple facilities where the product manufacturer is, for example, geographically dispersed.

Each product at each product level 92 may include a machine-readable (MR) code 152 thereon or therein. In one example, fraudulent products may include IC chips 102 and/or related downstream product levels such as IC chip packages 104 and PCBs 106 that use the IC chips. As noted, fraudulent IC chips or downstream products can negatively impact quality, safety and security of the end products, and the reputation of manufacturers along the product manufacturing chain. Fraudulent products, such as IC chips, can be inserted into a legitimate product manufacturing chain, for example, by bad actors selling fraudulent products to next-in-line product manufacturers. "Fraudulent products" thus means product not manufactured by the product manufacturer from which they are stated to be from, and likely to be illegitimate, completely fake or at least of less quality, broken and/or inoperable. In contrast, "valid" product indicates the product is manufactured by the product manufacturer from which they are stated to be from, and are of legitimate, high quality and operable for their intended purpose. Fraudulent products can enter chain 90 practically anywhere along the path. For example, fraudulent wafers 100 or IC chips 102 can be sold to IC chip packagers (manufacturer B), fraudulent IC chip packages 104 can be sold to printed circuit board (PCB) manufacturers (manufacturer D), or fraudulent PCBs 106 may be sold to end product manufacturers (manufacturer E). Fraudulent parts can also enter chain 90 in ways other than sale to the product manufacturer. In any event, as is obvious, an initial product manufacturer, such as a wafer manufacturer A, and each downstream manufacturer B-E wants to ensure they are purchasing and using the valid products, e.g., to ensure quality, safety, and security.

Embodiments of the disclosure use machine-readable codes to verify product legitimacy along chain 90 (FIG. 1).

Machine-readable code may be any two-dimensional array of contrasting light and dark (e.g., white and black, or dark and transparent) structures (e.g., metal wire material and surrounding ILD material) that is used to provide easy access to other information stored elsewhere, e.g., database, Internet, etc., and is readable and interpretable by a scanner at each product manufacturer. A scanner may include any device capable of reading machine-readable code, e.g., a digital imaging device, camera, smartphone, etc., having a reader application. Machine-readable code is not an alpha-numeric label and is not human-readable.

Figures 2, 3, 4, 5, 6:
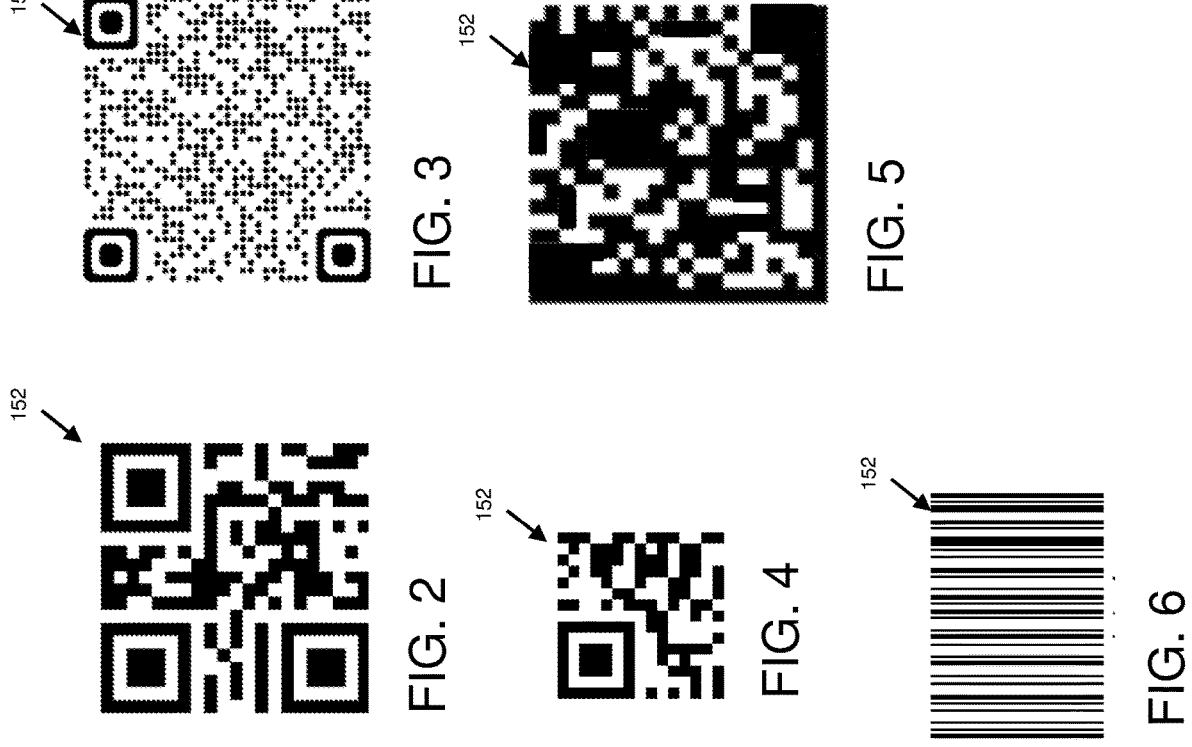
FIG. 2 is a top-down view of a machine-readable code in the form of a quick response (QR) code, according to embodiments of the disclosure.
FIG. 3 is a top-down view of a machine-readable code in the form of a QR code, according to other embodiments of the disclosure.
FIG. 4 is a top-down view of a machine-readable code in the form of a micro QR code, according to embodiments of the disclosure.
FIG. 5 is a top-down view of a machine-readable code in the form of a data matrix, according to embodiments of the disclosure.
FIG. 6 is a top-down view of a machine-readable code in the form of a bar code, according to embodiments of the disclosure.

FIGS. 2-6 show top-down views of illustrative machine-readable codes 152. FIGS. 2 and 3 show variations of a quick response (QR) code. FIG. 2 shows a QR code with structured blocks, and FIG. 3 shows a QR code with structured blocks and dotted structures. FIG. 4 shows a micro-QR code, which has similar structure to a QR code, but may include less data than a QR code and may use less area. FIG. 5 shows a data matrix, and FIG. 6 shows a bar code. Machine-readable code 152 may have other forms not expressly disclosed herein.

Machine-readable code 152 may include any variety of data. In any event, machine-readable code 152 includes some form of an identifier that can be used to verify if the product level to which it associates is valid, i.e., not a fraudulent part, using system 150. In certain embodiments, machine-readable code 152 may include additional data regarding at least one of product information, i.e., beyond just an identifier to verify custody. Product information may include a unique identifier such as the product name or the identification of equipment, e.g., mask set for IC chip 102, used to manufacture the product level.

Figure 7:
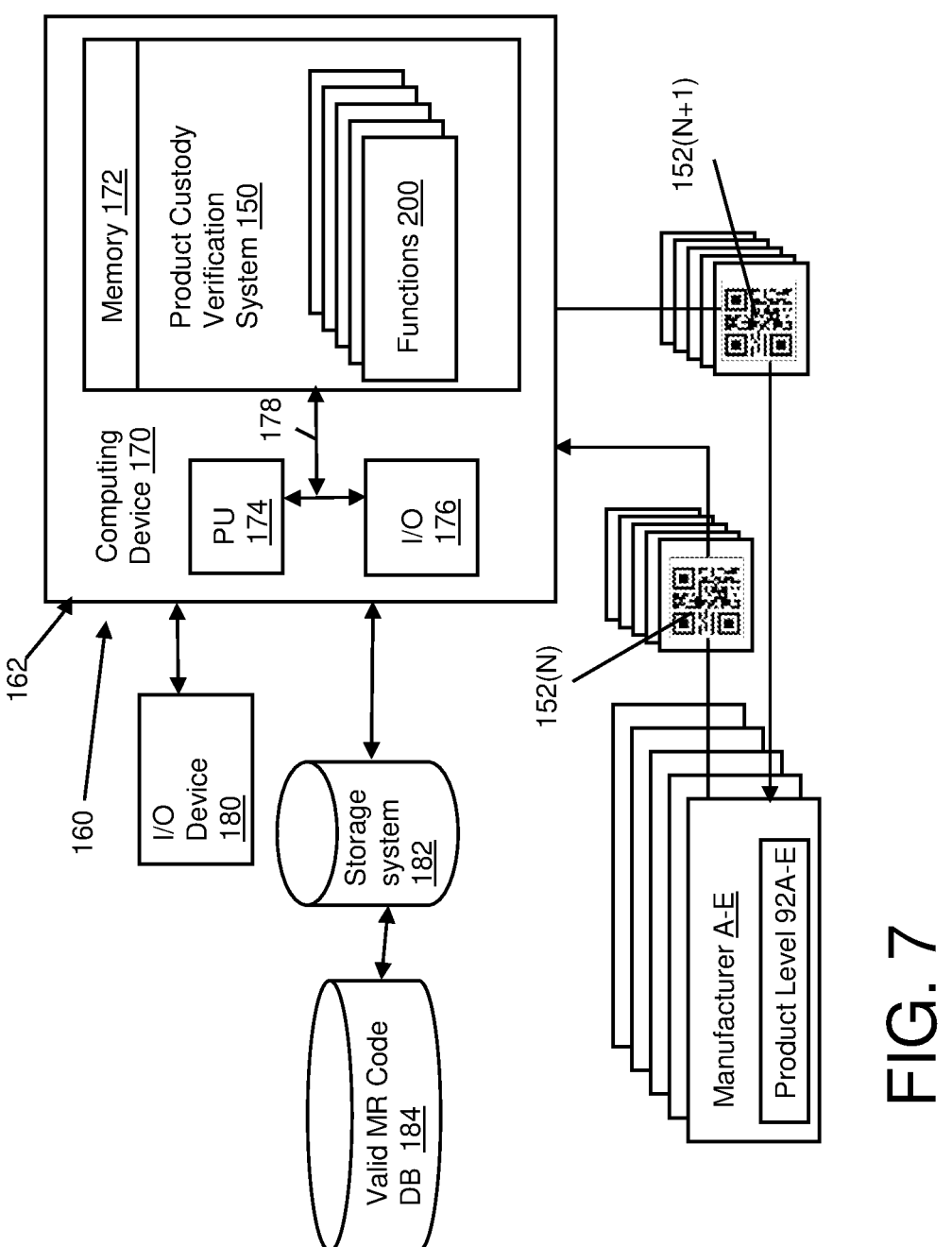
FIG. 7 is a block diagram of a product custody verification system, according to embodiments of the disclosure.
Figure 8:
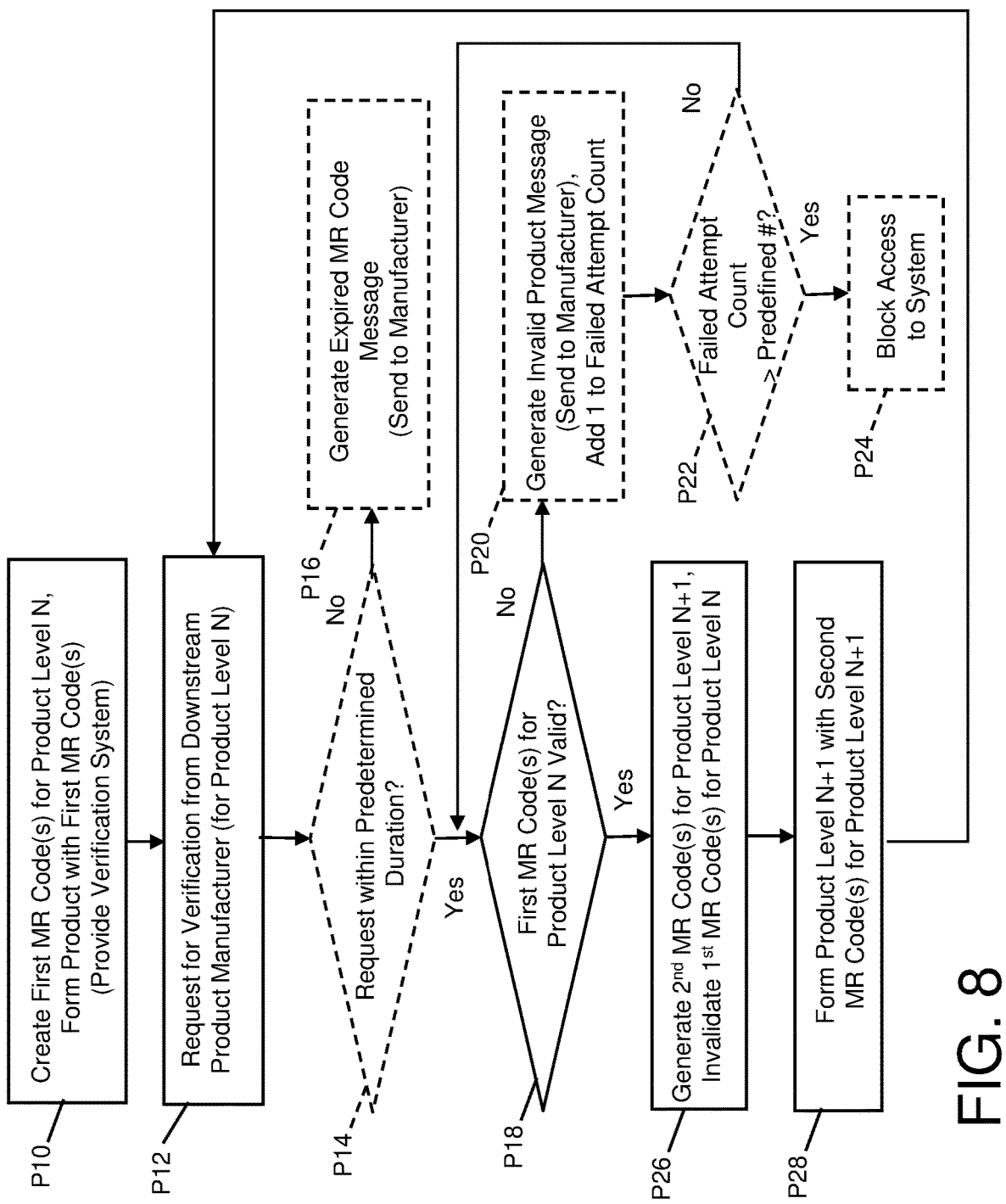
FIG. 8 is a flow diagram of an operational methodology for the product custody verification system, according to embodiments of the disclosure.

FIG. 7 is a block diagram of a product custody verification system 150, and FIG. 8 is a flow diagram of an operational methodology for system 150, according to embodiments of the disclosure. More particularly, FIG. 7 shows an illustrative environment 160 for system 150. To this extent, environment 160 includes a computer infrastructure 162 that can perform the various process steps described herein for system 150. In particular, computer infrastructure 162 is shown including a computing device 170 that comprises system 150, which enables computing device 170 to perform the process steps of the disclosure.

Computing device 170 is shown including a memory 172, a processor (PU) 174, an input/output (I/O) interface 176, and a bus 178. Further, computing device 170 is shown in communication with an external I/O device/resource 180 and a storage system 182. As is known in the art, in general, processor 174 executes computer program code, such as system 150, that is stored in memory 172 and/or storage system 182. While executing computer program code, processor 174 can compare, and read and/or write data, such as operational data, to/from memory 172, storage system 182, and/or I/O interface 176. Bus 178 provides a communications link between each of the components in computing device 170. I/O device 180 can comprise any device that enables a user to interact with computing device 170 or any device that enables computing device 170 to communicate with one or more other computing devices. Input/output devices (including but not limited to keyboards, displays, pointing devices, etc.) can be coupled to the system either directly or through intervening I/O controllers.

In any event, computing device 170 can comprise any general-purpose computing article of manufacture capable of executing computer program code installed by a user (e.g., a personal computer, server, handheld device, etc.). However, it is understood that computing device 170 and system 150 are only representative of various possible equivalent computing devices that may perform the various process steps of the disclosure. To this extent, in other embodiments, computing device 170 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 162 is only illustrative of various types of computer infrastructures for implementing the disclosure. For example, in one embodiment, computer infrastructure 162 comprises two or more computing devices (e.g., a server cluster) that communicate over any type of wired and/or wireless communications link, such as a network, a shared memory, or the like, to perform the various process steps of the disclosure. When the communications link comprises a network, the network can comprise any combination of one or more types of networks (e.g., the Internet, a wide area network, a local area network, a virtual private network, etc.). Network adapters may also be coupled to the system to enable the data processing system to become coupled to other data processing systems or remote printers or storage devices through intervening private or public networks. Modems, cable modem and Ethernet cards are just a few of the currently available types of network adapters. Regardless, communications between the computing devices may utilize any combination of various types of transmission techniques.

As previously mentioned, and discussed further below, system 150 enables computing infrastructure 162 to verify product custody along a product manufacturing chain. To this extent, system 150 is shown including a plurality of functions 200 that may verify data, generate new MR codes 152, count attempts at verification, determine whether an MR code has expired, among other functions capable of facilitating operation of system 150 other than as expressly described herein. It is understood that some of the various systems shown in FIG. 7 can be implemented independently, combined, and/or stored in memory for one or more separate computing devices that are included in computer infrastructure 162. Further, it is understood that some of the systems and/or functionality may not be implemented, or additional systems and/or functionality may be included as part of environment 160.

With reference to FIGS. 7 and 8, operation of system 150 in accordance with embodiments of a computerized method of the disclosure will now be described. Computing system 150 includes a memory, i.e., memory 172 and/or storage system 182. Storage system 182 may include a database 184 of valid MR codes, i.e., valid MR code database (DB) 184, including a listing of MR codes 152 that are valid, indicating the products to which the MR codes 152 are associated are not fraudulent products. System 150 also includes a processor, i.e., PU 174, coupled to the memory and configured to verify product custody along a product manufacturing chain 90 (FIG. 1).

In process P10, as an initial setup process, a user may use system 150 to create MR codes 152 for product level N, e.g., for some form of an initial product such as a wafer 100 (FIG. 1). That is, system 150 allows an upstream product manufacturer, e.g., product manufacturer A (FIG. 1), that manufactures product level N to create valid first MR codes 152(N) in database 184 of valid MR codes. The letter 'N' indicates any previous upstream product level in a given chain 90 (FIG. 1), and 'N+1' indicates the next downstream product level in the given chain 90 (FIG. 1). MR codes 152 for product level N being in valid MR code DB 184 indicate that those products are valid (i.e., not fraudulent) and can be trusted to be from the intended product manufacturer(s). Process P10 may also include forming first MR code 152(N) for use with the product level N, i.e., prior to any verifying of product custody according to embodiments of the disclosure. For example, first MR code 152(N) may be formed on a wafer 100 (FIG. 1) and or in or on each IC chip 102 (FIG. 1) in wafer. The forming may include any now known or later process for associating first MR code(s) 152(N) with the corresponding product level. For example, the forming may include forming first MR code(s) 152(N) in the product, e.g., in a metal layer of IC chip 102, or on the product, e.g., by printing it on a surface of the product or on a label to be attached to the product. An initial product manufacturer or system 150 may form first MR code 152(N) through any manner of interaction with the particular product manufacturer's other system, e.g., sending instructions to use first MR code 152(N).

System 150 may be provided by any product manufacturer within chain 90 (FIG. 1), e.g., the initial product level N manufacturer (as noted in process P10), or system 150 may be provided by some other third party.

In process P12, system 150 receives a request for verification from a downstream product manufacturer for a product of product level N. That is, the downstream product manufacturer, e.g., 92B-E (FIG. 1), that wants to know whether the products they have of product level N are from the intended, upstream product manufacturer of product level N submits a request to system 150. Hence, verifying whether first MR code 152(N) for the product level N is valid may occur in response to a request from a downstream product manufacturer along chain 90 (FIG. 1) that manufactures the product level N+1, i.e., the product level relying on the validity of product level N. The request has the added advantage that the operator of system 150 and, if desired, one or more upstream product manufacturers in chain 90 (FIG. 1), now knows the status of use of product level N, e.g., the manufacture of the next product level N+1 is started or imminent. In this manner, system 150 provides live monitoring of progress of products at different product levels 92A-E along chain 90 (FIG. 1).

Process P14-P16 are optional steps that can be used where it is desired to have valid MR codes have a predetermined life, i.e., they expire and cannot be used to verify product custody after a certain time. In process P14, system 150 verifies whether the request from the downstream product manufacturer is received within a predetermined duration. The predetermined duration may be user defined and may vary depending on factors such as but not limited to: the expected timeframe from product level N manufacturer to use by a downstream product manufacturer, lifespan of the product, and/or expected transit times for products. If MR code 152(N) is not received within the predetermined duration, i.e., 'No' at process P14, at process P16, system 150 generates an expired MR code message, which can be communicated to the requesting product manufacturer. Processing may stop after process P16 until another request is received by system 150. If MR code 152(N) is received within the predetermined duration, i.e., 'Yes' at process P14, processing moves to process P18.

In process P18, system 150 verifies whether a first machine-readable (MR) code 152(N) for a product level N is valid by comparing first MR code 152(N) to a database of valid MR codes, i.e., valid MR code DB 184. More particularly, system 150 compares the decrypted or decoded data from first MR code 152(N) with the decrypted or decoded data of valid MR codes in valid MR code DB 184. The decrypted or decoded data from the MR codes can take any now known or later developed form, such but not limited to an alphabetic, numerical or alphanumeric sequence. If MR code 152(N) is in valid MR code DB 184, it is valid; and if is not, then it is invalid. In response to verifying first MR code 152(N) for the product level N is invalid, i.e., 'No' at process P18, at process P20, system 150 may optionally generate an invalid product message, which can be communicated to the requesting product manufacturer.

System 150 may also optionally prevent access to the system, e.g., database 184, in response to a selected number of failed attempts to verify first MR code 152(N) for the product level N in database 184 is valid. In this regard, system 150 may count a number of failed attempts to verify using a particular first MR code 152(N). In process P22, system 150 determines whether the failed attempt count is greater than a predefined number (#). If the failed attempt count is greater than the predefined number (#), i.e., 'Yes' at process P22, in process P24, system 150 may block access to the system to prevent any further fraudulent activity. Alternatively, if the failed attempt count is not greater than the predefined number (#), i.e., 'No' at process P22, processing may return to process P18, allowing a user to try the same MR code 152(N) or another MR code 152(N).

Returning to process P18, in response to verifying first MR code 152(N) for the product level N is valid, i.e., 'Yes' at process P18, processing moves to process P26. In process P26, system 150 generates a second, valid MR code 152 (N+1) for a next product level N+1 in database 184 of valid MR codes and invalidates first MR code 152(N) for the product level N in database 184 of valid MR codes. "Invalidating" first MR code 152(N) indicates the MR code (i.e., decrypted or decoded data of the MR code) is noted as invalid, deleted, or otherwise prevented from additional use. In this manner, system 150 thus informs a downstream product manufacturer that the product level N they have received is valid, i.e., not fraudulent, and provides the manufacturer with a new, valid MR code 152 (N+1) for the next product level. Hence, each product level that is produced has its own unique MR code, and once the unique MR code is used to validate product level N, it cannot be used again. Where system 150 checks whether first MR code 152(N) has not expired, system 150 thus generates second, valid MR code 152 (N+1) for the next product level N+1 in database 184 of valid MR codes and invalidates first MR code(s) 152(N) for the product level N in database 184 of valid MR codes in response to both verifying first MR code(s) 152(N) for the product level N is valid and verifying the request is received within the predetermined duration.

In process P28, system 150 may form the next product level N+1 with second MR code 152 (N+1) for use with the next product level N+1. The second, valid MR code 152 (N+1) has new, unique data (e.g., alphabetic, numerical and/or alphanumeric sequence) encrypted or coded therein. The forming may include any now known or later process for associating second MR code 152 (N+1) with the corresponding product level. For example, the forming may include forming second MR code 152 (N+1) in the product, e.g., in a metal layer of IC chip 102, or on the product, e.g., by printing it on a surface of the product or on a label to be attached to the product. System 150 may form second MR code 152 (N+1) through any manner of interaction with a particular product manufacturer's other system, e.g., sending instructions to use second MR code 152 (N+1) in another manufacturing system where system 150 in not integrated with such a system.

System 150 may also verify more than one first MR code 152(N) at each product level. That is, at process P18, system 150 may verify a predetermined plurality of first MR codes 152(N) for the product level N are valid by comparing each of the predetermined plurality of first MR codes 152(N) to database 184 of valid MR codes. Further, in response to verifying each of the predetermined plurality of first MR codes 152(N) for the product level N are valid, system 150 may generate one or more second, valid MR code(s) 152 (N+1) for the next product level N+1 in database 184 of valid MR codes and invalidate each of the predetermined plurality of first MR codes 152(N) for the product level N in database 184 of valid MR codes.

As shown in FIG. 8, the method may further include repeating the verifying, the generating and the forming may include forming more than one next product level along chain 90 (see return arrow from process P28 to process P12). Any number of product levels within one or more product manufacturers can be verified.

Where system 150 is used for a chain 90 (FIG. 1) that uses IC chips 102 (FIG. 1), the computerized method may be advantageous for those downstream product manufacturers purchasing or using IC chips 102 (FIG. 1), i.e., along an integrated circuit (IC) chip product manufacturing chain. In this case, process P18 may include system 150 verifying first MR code(s) 152(N) for an IC chip-including product level N is valid by comparing first MR code(s) 152(N) to database 184 of valid MR codes. Similarly, in response to verifying the first MR code(s) 152(N) for the IC chip-including product level N is valid, process P26 may include system 150 generating second, valid MR code(s) 152 (N+1) for a next, IC chip-including product level N+1 in database 184 of valid MR codes and invalidating first MR code(s) 152(N) for the IC chip-including product level N in database 184 of valid MR codes. Process P28 may include forming second MR code(s) 152 (N+1) for use with the next, IC chip-including product level N+1, as described herein.

Embodiments of the disclosure provide various technical and commercial advantages, examples of which are discussed herein. The system ensures custody of product levels along a manufacturing chain can be verified and secured, avoiding bad actors from profiting by inserting fraudulent products into the manufacturing chain. The verification system also provides custody assurance for products having highly valuable and/or national security applications. The verification also allows live monitoring of each product level through the manufacturing flow, e.g., by an initial product manufacturer.

The flowchart and block diagrams in the drawings illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As discussed herein, various systems and components are described as "obtaining" data (e.g., system 150, etc.). It is understood that the corresponding data can be obtained using any solution. For example, the corresponding system/ component can generate and/or be used to generate the data, retrieve the data from one or more data stores (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method for verifying product custody along a product manufacturing chain, comprising:

providing an integrated circuit (IC) chip in an IC chip-including product level N, formed at an upstream product manufacturer along the product manufacturing chain, wherein the IC chip includes a first machine-readable (MR) code thereon;

verifying the first MR code for the IC chip-including product level N is valid by comparing the first MR code to a database of valid MR codes;

generating a second, valid MR code for a next, IC chip-including product level N+1 in the database of valid MR codes and invalidating the first MR code for the IC chip-including product level N in the database of valid MR codes in response to verifying the first MR code for the IC chip-including product level N is valid; and forming an IC chip package, including the IC chip, in the next, IC chip-including product level N+1 at a downstream product manufacturer along the product manufacturing chain, the IC chip package including the second MR code thereon, for use with the next, IC chip-including product level N+1.

2. The method of claim 1, further comprising repeating the verifying, the generating and the forming includes forming for more than one next, IC chip-including product level along the product manufacturing chain.

3. The method of claim 1, wherein the IC chip in the IC chip-including product level N is one of a plurality of IC chips, and the verifying includes verifying a predetermined plurality of first MR codes for the plurality of IC chips in IC chip-including product level N are valid by comparing each of the predetermined plurality of first MR codes to the database of valid MR codes, and wherein the generating includes generating the second, valid MR code for the next, IC chip-including product level N+1 in the database of valid MR codes and invalidating each of the predetermined plurality of first MR codes for the IC chip-including product level N in the database of valid MR codes in response to verifying each of the predetermined plurality of first MR codes for the plurality of IC chips in IC chip-including product level N are valid.

4. The method of claim 1, further comprising generating an invalid product message in response to the first MR code for the IC chip in IC chip-including product level N being invalid.

5. The method of claim 1, further comprising preventing access to the database in response to a selected number of failed attempts to verify the first MR code for the IC chip in IC chip-including product level N in the database is valid.

6. The method of claim 1, wherein the verifying the first MR code for the IC chip in IC chip-including product level N occurs in response to a request from the downstream product manufacturer.

7. The method of claim 6, further comprising allowing the upstream product manufacturer to create valid first MR codes in the database of valid MR codes.

8. The method of claim 7, further comprising verifying the request from the downstream product manufacturer is received within a predetermined duration, and wherein the generating the second, valid MR code for the IC chip package in next, IC chip-including product level N+1 in the database of valid MR codes and invalidating the first MR code for the IC chip in IC chip-including product level N in the database of valid MR codes occurs in response to both verifying the first MR code for the IC chip in IC chip-including product level N is valid and verifying the request is received within the predetermined duration.

9. The method of claim 1, further comprising allowing the upstream product manufacturer to create valid first MR codes in the database of valid MR codes, and wherein verifying the first MR code for the IC chip in IC chip-including product level N occurs in response to a request from the downstream product manufacturer.

10. The method of claim 1, wherein the product manufacturing chain includes at least two of the following product manufacturers: an IC chip fabricator, an IC chip separator, an IC chip module manufacturer, an IC chip packager, an IC chip package end user, a printed circuit board (PCB) manufacturer, and a PCB end user.

11. The method of claim 1, wherein the forming the first MR code for use with the IC chip in IC chip-including product level N occurs prior to the verifying.

12. A method for verifying product custody along a product manufacturing chain, comprising:

providing an integrated circuit (IC) chip in an IC chip-including product level N, formed at an upstream product manufacturer, wherein the IC chip includes a first machine-readable (MR) code thereon;

verifying the first MR code for the IC chip-including product level N is valid by scanning the first MR code and comparing the first MR code to a database of valid MR codes;

generating a second, valid MR code for a next, IC chip-including product level N+1 in the database of valid MR codes and invalidating the first MR code for the IC chip-including product level N in the database of valid MR codes in response to verifying the first MR code for the IC chip-including product level N is valid; and forming an IC chip package, including the IC chip, in the next, IC chip-including product level N+1 at a downstream product manufacturer, the IC chip package including the second MR code thereon, for use with the next, IC chip-including product level N+1.

13. The method of claim 12, further comprising repeating the verifying, the generating, and the forming includes forming for more than one next, IC chip-including product level along the product manufacturing chain.

14. The method of claim 12, wherein the IC chip in the IC chip-including product level N is one of a plurality of IC chips, and the verifying includes verifying a predetermined plurality of first MR codes for the plurality of IC chips in IC chip-including product level N are valid by comparing each of the predetermined plurality of first MR codes to the database of valid MR codes, and wherein the generating includes generating the second, valid MR code for the next, IC chip-including product level N+1 in the database of valid MR codes and invalidating each of the predetermined plurality of first MR codes for the IC chip-including product level N in the database of valid MR codes in response to verifying each of the predetermined plurality of first MR codes for the plurality of IC chips in IC chip-including product level N are valid.

15. The method of claim 12, further comprising preventing access to the database in response to a selected number of failed attempts to verify the first MR code for the IC chip in IC chip-including product level N in the database is valid.

16. The method of claim 12, wherein the verifying the first MR code for the IC chip in IC chip-including product level N occurs in response to a request from the downstream product manufacturer, and further comprising allowing the upstream product manufacturer that manufactures the IC chip in IC chip-including product level N to create valid first MR codes in the database of valid MR codes.

17. The method of claim 16, further comprising verifying the request from the downstream product manufacturer is received within a predetermined duration, and wherein the generating the second, valid MR code for the IC chip package in next, IC chip-including product level N+1 in the database of valid MR codes and invalidating the first MR code for the IC chip in IC chip-including product level N in the database of valid MR codes occurs in response to both verifying the first MR code for the IC chip in IC chip-including product level N is valid and verifying the request is received within the predetermined duration.

18. The method of claim 12, wherein the verifying the first MR code for the IC chip in IC chip-including product level N is based on a request from the downstream product manufacturer.

19. The method of claim 12, wherein the product manufacturing chain includes at least two of the following product manufacturers: an IC chip fabricator, an IC chip separator, an IC chip module manufacturer, an IC chip packager, an IC chip package end user, a printed circuit board (PCB) manufacturer, and a PCB end user.

20. A method comprising:

providing an integrated circuit (IC) chip in an IC chip-including product level N, formed at an upstream product manufacturer, wherein the IC chip includes a first machine-readable (MR) code thereon;

verifying the first MR code for the IC chip-including product level N is valid by comparing the first MR code to a database of valid MR codes;

generating a second, valid MR code for a next, IC chip-including product level N+1 in the database of valid MR codes and invalidating the first MR code for the IC chip-including product level N in the database of valid MR codes in response to verifying the first MR code for the IC chip-including product level N is valid;

forming an IC chip package, including the IC chip, in the next, IC chip-including product level N+1 at a downstream product manufacturer, the IC chip package including the second MR code thereon, for use with the next, IC chip-including product level N+1; and granting live access to the database of valid MR codes to the upstream product manufacturer and the downstream product manufacturer.

\* \* \* \* \*